(12) United States Patent
Chuang et al.

(10) Patent No.: US 12,308,694 B2
(45) Date of Patent: May 20, 2025

(54) POWER SUPPLY SYSTEM AND METHOD OF OPERATING THE SAME

(71) Applicant: DELTA ELECTRONICS, INC., Taoyuan (TW)

(72) Inventors: Shih-Chang Chuang, Taoyuan (TW); Te-Chih Peng, Taoyuan (TW); Ming-Hsiang Lo, Taoyuan (TW); Chih-Hong Wu, Taoyuan (TW); Min-Cheng Chiang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/147,100

(22) Filed: Jan. 12, 2021

(65) Prior Publication Data
US 2021/0320519 A1  Oct. 14, 2021

Related U.S. Application Data

(60) Provisional application No. 63/007,569, filed on Apr. 9, 2020.

(51) Int. Cl.
*H02J 9/06* (2006.01)
*G05F 1/56* (2006.01)
(Continued)

(52) U.S. Cl.
CPC ............... *H02J 9/061* (2013.01); *G05F 1/56* (2013.01); *G06F 1/30* (2013.01); *H01M 10/441* (2013.01);
(Continued)

(58) Field of Classification Search
CPC .. H02J 9/06; H02J 9/061; H02J 7/0048; H02J 7/0024; H02J 7/0063; H02J 7/0013;
(Continued)

(56) References Cited

U.S. PATENT DOCUMENTS

| 6,172,478 B1 * | 1/2001 | Leppo | H02J 7/0068 320/119 |
| 9,859,751 B2 * | 1/2018 | Shin | H02J 7/34 |

(Continued)

FOREIGN PATENT DOCUMENTS

| EP | 3070813 A1 | 9/2016 |
| EP | 3624301 A1 | 3/2020 |

(Continued)

OTHER PUBLICATIONS

Japan office action dated Feb. 22, 2022 of Japan patent application No. 2021-32227.
(Continued)

*Primary Examiner* — Lincoln D Donovan
*Assistant Examiner* — James G Yeaman
(74) *Attorney, Agent, or Firm* — Muncy, Geissler, Olds & Lowe, P.C.

(57) ABSTRACT

A power supply system includes a plurality of power supply units and a plurality of battery units. Each power supply unit is coupled to a common bus through a first switch. Each battery unit is corresponding to each power supply unit, and is coupled to the common bus through a second switch. Any one of the power supply units turns on the corresponding first switch and turns on the second switches of other battery units so that the power supply unit acquires power electricity from other battery units through the common bus.

20 Claims, 13 Drawing Sheets

(51) Int. Cl.
*G06F 1/30* (2006.01)
*H01M 10/44* (2006.01)
*H02J 7/00* (2006.01)

(52) U.S. Cl.
CPC .......... *H02J 7/0024* (2013.01); *H02J 7/0048* (2020.01); *H02J 7/0063* (2013.01)

(58) Field of Classification Search
CPC .... H02J 7/34; G05F 1/56; G06F 1/30; H01M 10/441; Y02E 60/10
See application file for complete search history.

(56) References Cited

U.S. PATENT DOCUMENTS

| | | | |
|---|---|---|---|
| 10,270,285 B2 * | 4/2019 | Mandarino | H02J 9/061 |
| 10,375,850 B2 * | 8/2019 | Klikic | H05K 7/1489 |
| 2016/0248261 A1 | 8/2016 | Tokuda et al. | |
| 2018/0149709 A1 * | 5/2018 | Jo | G01R 31/392 |
| 2020/0044465 A1 * | 2/2020 | Kurosaki | H02J 9/06 |
| 2020/0079520 A1 | 3/2020 | Demizu et al. | |
| 2020/0220379 A1 * | 7/2020 | Chang | H02J 3/381 |
| 2021/0328454 A1 | 10/2021 | Lee et al. | |

FOREIGN PATENT DOCUMENTS

| | | | |
|---|---|---|---|
| JP | 2006288162 A | | 10/2006 |
| JP | 2012065503 A | | 3/2012 |
| JP | 2013135533 A | * | 7/2013 |
| JP | 2014079139 A | | 5/2014 |
| KR | 20050093290 A | * | 9/2005 |
| WO | WO2016/190085 A1 | | 1/2016 |
| WO | WO2018/211882 A1 | | 11/2018 |
| WO | 2020055020 A1 | | 3/2020 |

OTHER PUBLICATIONS

European search report dated Jul. 9, 2021 of European patent application No. EP21152774.2.
Office Action dated May 23, 2023 of the corresponding Japan patent application No. 2021-032227, 3 pages.
Office Action dated Jan. 18, 2024 of the corresponding European patent application No. 21152774.2.

* cited by examiner

POWER SUPPLY SYSTEM AND METHOD OF OPERATING THE SAME

CROSS-REFERENCE TO RELATED APPLICATION

This patent application claims the benefit of U.S. Provisional Patent Application No. 63/007,569, filed Apr. 9, 2020, which is incorporated by reference herein.

BACKGROUND

Technical Field

The present disclosure relates to a power supply system and a method of operating the same, and more particularly to a power supply system with shared batteries and a method of operating the same.

Description of Related Art

The statements in this section merely provide background information related to the present disclosure and do not necessarily constitute prior art.

In recent years, with the development of the Internet, human life and Internet technology have become inseparable, relying more and more on the information and services provided by the Internet. Many functions such as video conferencing, remote work, social groups, dating sites, and audio-visual platforms to provide users with various Internet services.

To provide these services, enterprises need to set up cloud servers, edge servers, or use data centers to store data and user information. In the actual application of the server, in order to ensure that users can enjoy network services at any time and ensure data integrity, it is necessary to increase the reliability of the system and consider the timeliness of troubleshooting. Therefore, the power structure of the server usually uses redundant power supply (redundant PSU) and supports hot plug functions. N+1 power supply units (PSUs) are used for backup power supply, and even if any one of the PSUs fails, the system can still continue to normally work and will not cause system interruption when replacing a faulty PSU, thereby increasing stability and reliability.

On the other hand, in order to prevent the front-end power supply system from failing, backup solutions are usually deployed in the front-end, such as a centralized uninterruptible power system (UPS), backup battery module (backup battery unit, BBU), and backup generator. However, compared to the centralized UPS and BBU bank backup applications, the distributed BBU structure can increase configuration flexibility, improve the power efficiency of the system, and optimize the overall reliability.

As shown in FIG. 1, a conventional distributed PSU and BBU is illustrated, or a PSU with built-in BBU is illustrated as shown in FIG. 2. Each power supply is cooperated with a BBU, and when the front-end power supply system is normal, an AC power in the input end is converted into a DC power through the PSU to provide the system, and further to charge the BBU. When the front-end power supply system is failed, the BBU provides the power electricity to the PSU so that the PSU can still provide a stable DC voltage to keep the system working continuously without interruption until the power supply system returns to be normal. In the traditional structure, since a PSU corresponds to only one BBU, the PSU can only provide a rated and limited discharge time and power electricity under the inherent capacity and specifications of the battery. This means that the power frame needs diversified and multi-functional power management strategies to achieve the maximum utilization of the battery bank.

SUMMARY

An object of the present disclosure is to provide a power supply system to solve the problems of existing technology.

In order to achieve the above-mentioned object, the power supply system includes a plurality of power supply units and a plurality of battery units. Each power supply unit is coupled to a common bus through a first switch. Each battery unit is corresponding to each power supply unit, and each battery unit is coupled to the common bus through a second switch. Any one of the power supply units acquires power electricity from other battery units through the common bus by turning on the first switch corresponding to the power supply unit and turning on the second switches corresponding to other battery units.

Accordingly, in this power supply system, the shared power electricity can be provided by a plurality of battery units cooperated with the common bus so the discharge time of the battery units and the energy to the power supply unit are no longer limited to the inherent capacity and specifications of the corresponding battery unit, i.e., the local battery. Therefore, the power supply unit can effectively increase the utilization of the battery bank, improve configuration flexibility, increase the power efficiency of the system, and optimize the overall stability and reliability.

Another object of the present disclosure is to provide a method of operating a power supply system to solve the problems of existing technology.

In order to achieve the above-mentioned object, the power supply system includes a plurality of power supply units and a plurality of battery units, and each battery unit is corresponding to each power supply unit. The method includes steps of: determining whether any one of the power supply units needs to acquire power electricity from other battery units, turning on, by the power supply unit, a first switch coupled between the power supply unit and a common bus when the power supply unit needs to acquire power electricity from other battery units, and notifying, by the power supply unit, other power supply units to turn on second switches between other corresponding battery units and the common bus.

Accordingly, in this method of operating the power supply system, the shared power electricity can be provided by a plurality of battery units cooperated with the common bus so the discharge time of the battery units and the energy to the power supply unit are no longer limited to the inherent capacity and specifications of the corresponding battery unit, i.e., the local battery. Therefore, the power supply unit can effectively increase the utilization of the battery bank, improve configuration flexibility, increase the power efficiency of the system, and optimize the overall stability and reliability.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 2:
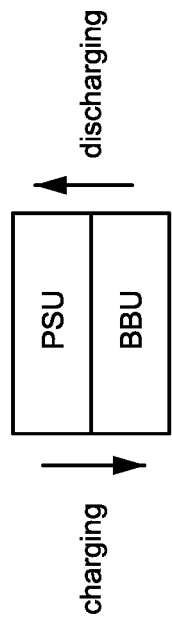
FIG. 2 is a structure diagram of the conventional PSU with built-in BBU.
Figure 1:
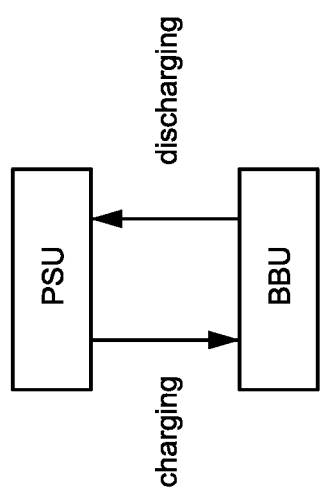
FIG. 1 is a structure diagram of the conventional distributed power supply unit (PSU) and backup battery unit (BBU).

Reference will now be made to the drawing figures to describe the present disclosure in detail. It will be understood that the drawing figures and exemplified embodiments of present disclosure are not limited to the details thereof.

The present disclosure provides a power frame with shared batteries. By sharing and exchanging of the power frame, the flexibility and utilization of battery bank are increased so as to solve that the discharge time of a single PSU is limited by the capacity of the local battery, and even support the corresponding PSU to provide greater output power.

Figure 3:
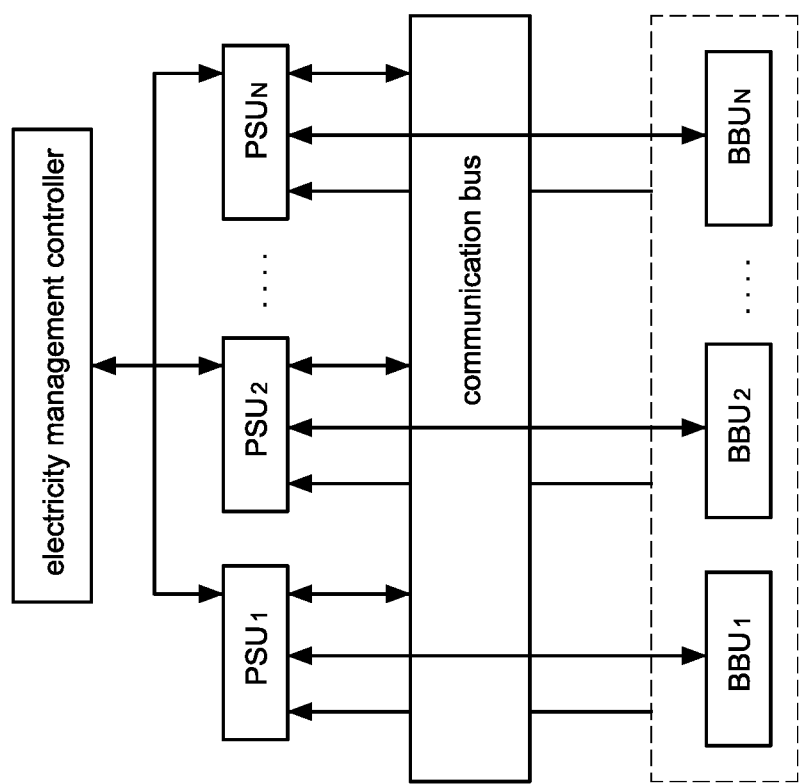
FIG. 3 is a block diagram of an electricity management system according to a first embodiment of the present disclosure.

Please refer to FIG. 3, which shows a block diagram of an electricity management system according to a first embodiment of the present disclosure. The power frame of the present disclosure is able to treat the batteries as local batteries or shared batteries. The shared batteries may be physical structure, or virtual implementation realized by the definition of the software layer on the local battery. Although the batteries may be distributed, and may be physically connected to power supplies in different locations. Therefore, the battery bank works as the same battery with this power frame configuration and operating system.

Figure 4:
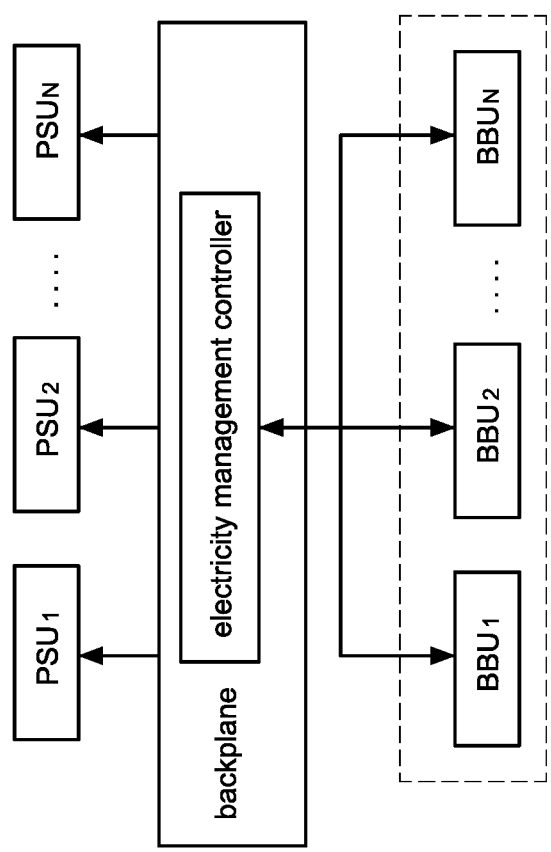
FIG. 4 is a block diagram of the electricity management system according to a second embodiment of the present disclosure.

The purpose of power management is to provide a local battery of easily accessing and increase the flexibility and battery utilization of the shared batteries. Please refer to FIG. 4, which shows a block diagram of the electricity management system according to a second embodiment of the present disclosure. The power management can be communicated through the communication interface or hardware I/O signals by an external coordination unit to collect the current output current or output power of each BBU in unified management so as to determine whether each BBU has additional capacity to provide power electricity to the shared battery bank.

Figure 5:
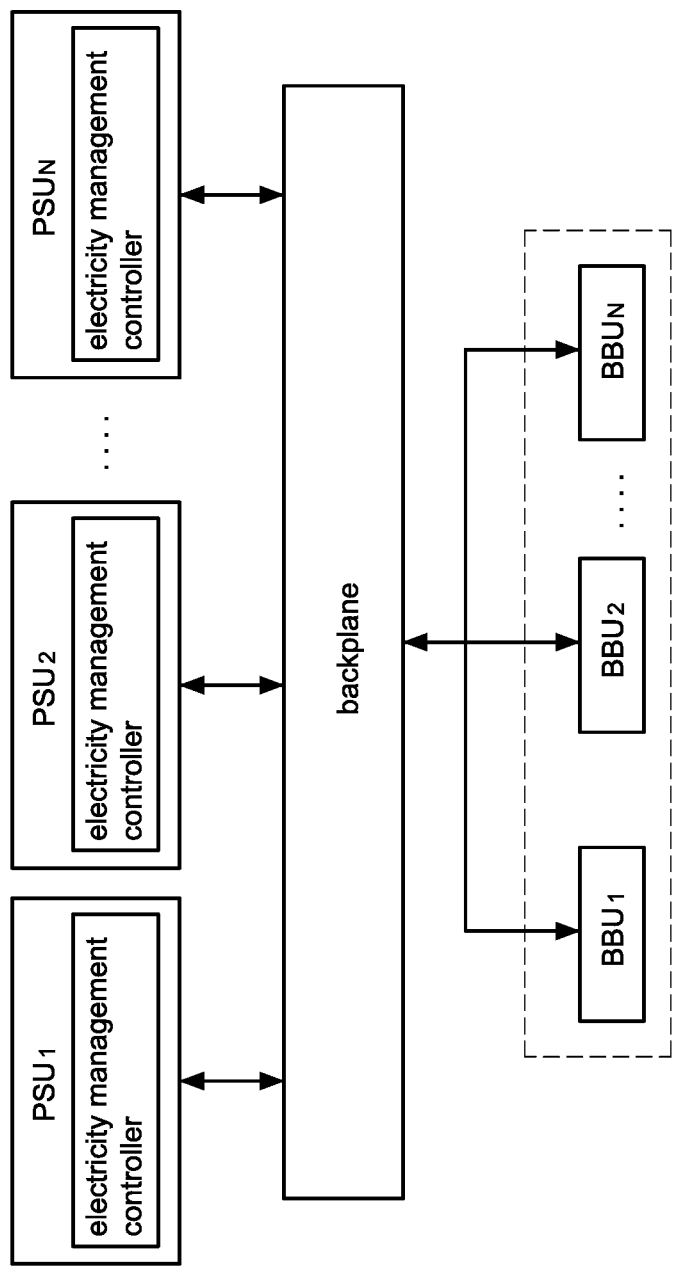
FIG. 5 is a block diagram of the electricity management system according to a third embodiment of the present disclosure.

Please refer to FIG. 5, which shows a block diagram of the electricity management system according to a third embodiment of the present disclosure. The power management can be independently implemented by the respective PSUs. The PSU monitors the output current and output power of the local battery to determine whether the local battery can provide power to the shared battery bank. Accordingly, the BBUs having sufficient power supply capacity share power electricity to the PSU that requires power support, and it is not limited to one-to-one supply relationship between the local batteries and the PSUs. Therefore, the present disclosure has three major technology features.

The first feature: under the rated power, the local battery provides power electricity to the corresponding PSU. Until the local battery warns, the shared batteries will take over the power supply, which can extend the backup time.

The second feature: over the rated power, the local battery provides its own rated power and the excess power is supplied by other shared battery so as to satisfy greater power output.

The third feature: when the RSOC (relative state-of-charge) of the local battery is lower, the local battery and other batteries can be alternately used, and the designated battery provides the required power electricity for the PSU to achieve the purpose of intelligent adjustment and maximize the utilization of the battery.

With the above-mentioned adjustment and control, all BBUs can be effectively utilized in the most effective and maximized electrical energy during the discharge process. Therefore, this is an effective solution to provide high-performance power frame design at the lowest cost. The detailed operation principle of the present disclosure will be described in detail with FIG. 6 and FIG. 7A to FIG. 7G.

Figure 6:
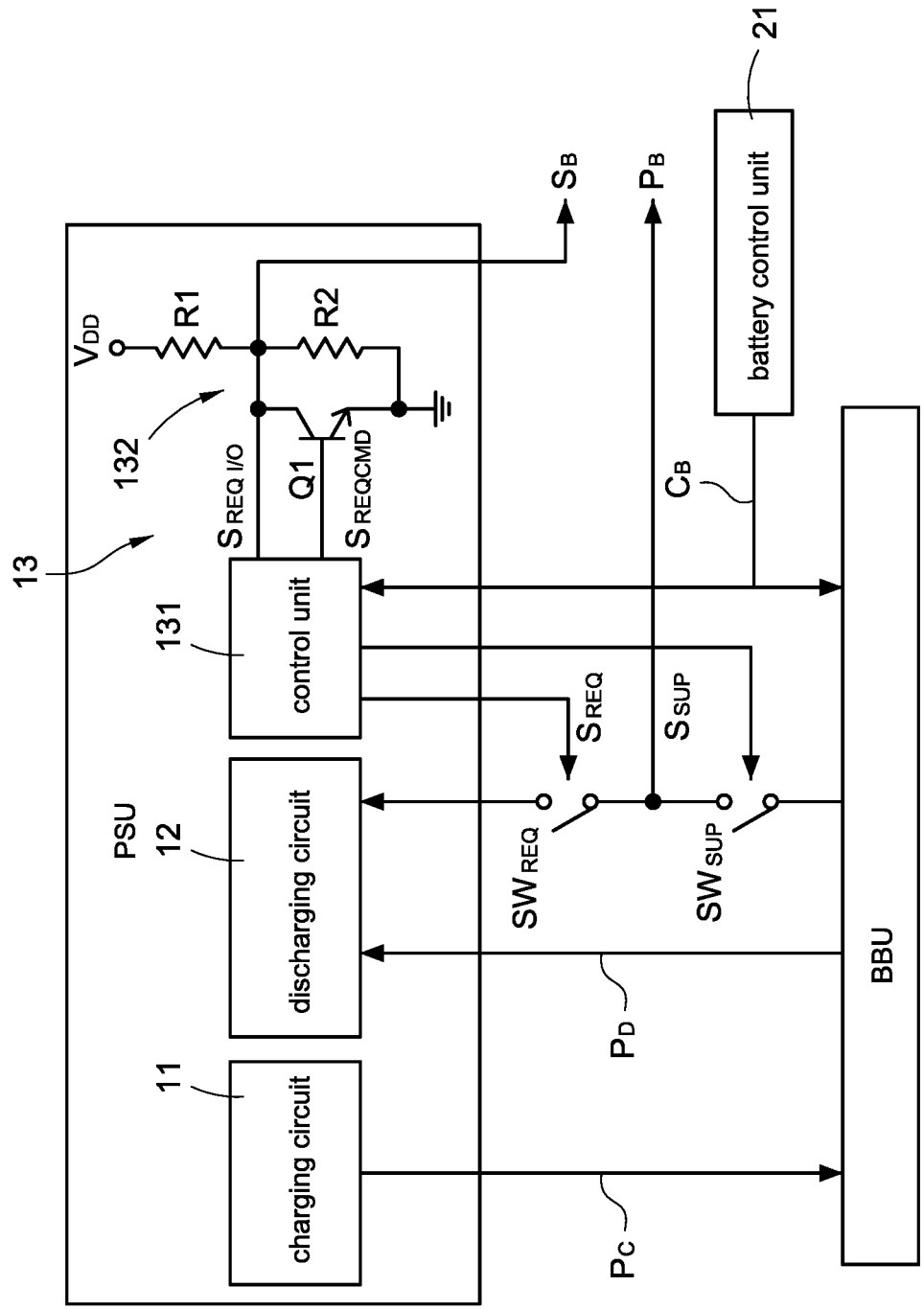
FIG. 6 is a block diagram of one power supply unit corresponding to one battery unit of a power supply system according to the present disclosure.

Please refer to FIG. 6, which shows a block diagram of one power supply unit corresponding to one battery unit of a power supply system according to the present disclosure. A single power supply unit PSU includes a charge circuit 11, a discharge circuit 12, and a control circuit 13. The power supply unit PSU is coupled to a common bus $P_B$ through a first switch $SW_{REQ}$. A battery unit BBU is coupled to the common bus $P_B$ through a second switch $SW_{SUP}$. The charge circuit 11 is used for the operation of charging the battery unit BBU by the corresponding power supply unit PSU. The discharge circuit 12 is used for the operation of discharging the power supply unit PSU by the corresponding battery unit BBU.

The control unit 13 includes a control unit 131 and a switch unit 132. The control unit 131 provides a first control signal $S_{REQ}$ to turn on or turn off the first switch $SW_{REQ}$, and the control unit 131 provides a second control signal $S_{SUP}$ to turn on or turn off the second switch $SW_{SUP}$, and detailed description will be explained later. The switch unit 132 is coupled to the control unit 131 and a signal bus $S_B$. The control unit 131 can realize a voltage level of the signal bus $S_B$ according to bus level signals $S_{REQI/O}$ received from other power supply units through the switch unit 132 so as to determine whether other power supply units raise power support requests. Moreover, when the power supply unit fails to acquire sufficient power electricity from the corresponding battery unit and needs to raise the power support request to acquire power electricity from other battery units, the control unit 131 provides a request command signal $S_{REQCMD}$ to control the switch unit 132.

For example, when the power supply unit PSU can acquire the sufficient power electricity from the corresponding battery unit without requesting the power supply support from other battery units, the control unit 131 provides a request command signal $S_{REQCMD}$ with a low voltage level to turn off the switch Q1. Therefore, the signal bus $S_B$ is a high voltage level, such as but not limited to 5 volts by dividing a power voltage $V_{DD}$ through a first resistor R1 and a second resistor R2. In other embodiments, it is also a feasible solution when only the first resistor R1 is used, i.e., the second resistor R2 is absent, and signal bus $S_B$ with the high voltage level can be also acquired. On the contrary, when the power supply unit PSU fails to acquire the sufficient from the corresponding battery unit and needs to request the power supply support from other battery units, the control unit 131 provides the request command signal $S_{REQCMD}$ with a high voltage level to turn on the switch Q1. Therefore, the signal bus $S_B$ is pulled to a low voltage level such as a ground voltage (zero volt) since the switch Q1 is turned on.

In particular, the switch unit 132 of detecting the bus level and providing the request command signal is not limited to the above-mentioned circuit, and a circuit that can achieve the functions can be used as the switch unit 132. The voltage levels of the request command signal $S_{REQCMD}$ of controlling the switch Q1 is not limited to the above-mentioned examples, that is, the voltage levels of controlling the switch Q1 can be changed with opposite voltage levels according to the type of the switch Q1.

Moreover, the power supply system further includes a battery control unit 21, and the battery control unit 21 may be, for example but not limited to, disposed on a backplane. The battery control unit 21 communicates with the control unit 131 and the battery unit BBU through a communication bus $C_B$, such as I2C bus to detect and control an RSOC of the battery unit BBU, and detailed description will be explained later.

Figure 7A:
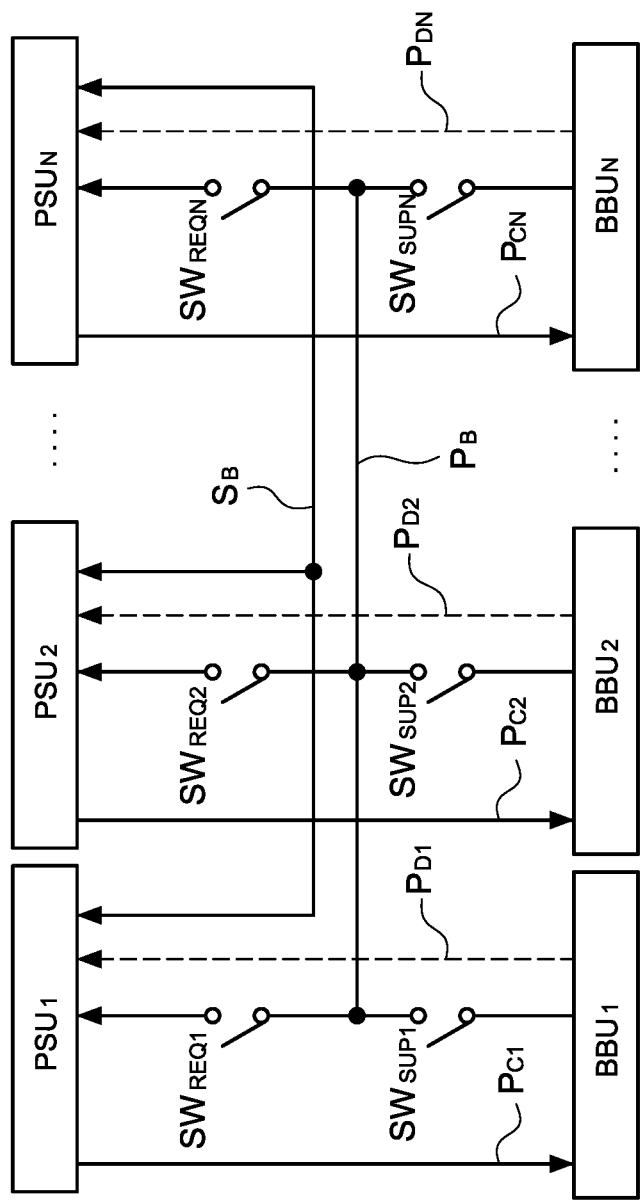
FIG. 7A is a schematic view of a first operation mode of the power supply system according to the present disclosure.

As shown in FIG. 7A, the power supply system of the present disclosure includes a plurality of power supply units $PSU_1$-$PSU_N$ and a plurality of battery units $BBU_1$-$BBU_N$ corresponding to the plurality of power supply units $PSU_1$-$PSU_N$. Each power supply unit $PSU_1$-$PSU_N$ is coupled to the common bus $P_B$ through a first switch $SW_{REQ1}$-$SW_{REQN}$. Each battery unit $BBU_1$-$BBU_N$ is coupled to the common bus $P_B$ through a second switch $SW_{SUP1}$-$SW_{SUPN}$. When any power supply unit $PSU_1$-$PSU_N$ cannot acquire the sufficient power electricity from the corresponding battery unit $BBU_1$-$BBU_N$, the power supply unit $PSU_1$-$PSU_N$ turns on the first switch $SW_{REQ1}$-$SW_{REQN}$ and notifies other power supply units $PSU_1$-$PSU_N$ to turn on second switches $SW_{SUP1}$-$SW_{SUPN}$ coupled between the other battery units $BBU_1$-$BBU_N$ and the common bus $P_B$ so that the power supply unit $PSU_1$-$PSU_N$ can acquire the power electricity from other battery units $BBU_1$-$BBU_N$ through the common bus $P_B$. Therefore, the coordination and sharing of the power electricity can be implemented to achieve the most effective and maximized power application.

Hereinafter, different operation modes (or operation scenarios) of the power supply system with shared batteries provided by the present disclosure will be described in detail.

Please refer to FIG. 7A, which shows a schematic view of a first operation mode of the power supply system according to the present disclosure. In the first operation mode, the power supply units $PSU_1$-$PSU_N$ normally operate, and therefore they can provide the required power electricity to the system and also correspondingly charge the battery units $BBU_1$-$BBU_N$. As shown in FIG. 7A, the power supply units $PSU_1$-$PSU_N$ charge the battery units $BBU_1$-$BBU_N$ through their respective charge paths $P_{C1}$-$P_{CN}$. In this operation mode, since each power supply unit $PSU_1$-$PSU_N$ does not need to request the power supply support from other battery units, each control unit 131 provides the request command signal $S_{REQCMD}$ with the low voltage level so that the signal bus $S_B$ is in the high voltage level. At this condition, all first switches $SW_{REQ1}$-$SW_{REQN}$ and all second switches $SW_{SUP1}$-$SW_{SUPN}$ are turned off.

Figure 7B:
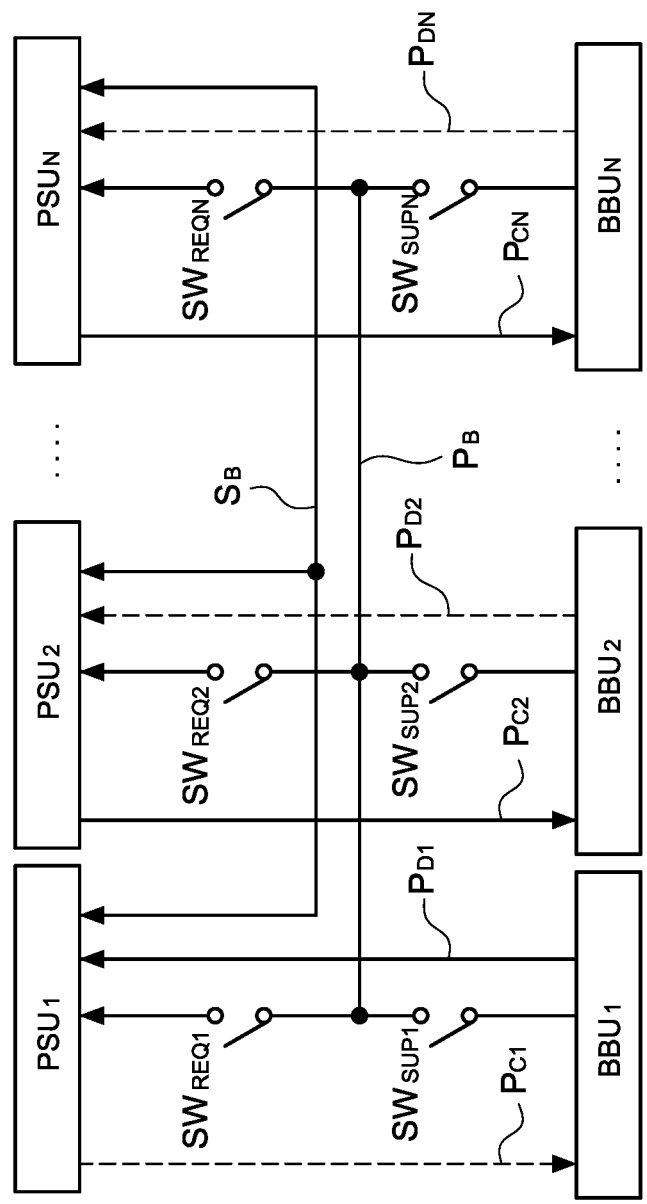
FIG. 7B is a schematic view of a second operation mode of the power supply system according to the present disclosure.

Please refer to FIG. 7B, which shows a schematic view of a second operation mode of the power supply system according to the present disclosure. In the second operation mode, when at least one power supply unit $PSU_1$-$PSU_N$ requires the power electricity provided from the corresponding battery unit $BBU_1$-$BBU_N$ and in the rated power, the battery unit $BBU_1$-$BBU_N$ corresponding to the power supply unit $PSU_1$-$PSU_N$ that requires the power supply is preferentially to supply power to the power supply unit $PSU_1$-$PSU_N$. The remaining battery units $BBU_1$-$BBU_N$ continue to maintain the charging state and wait for commands of communication or hardware signal. For example, when the first power supply unit $PSU_1$ needs the power electricity supported from the battery unit, the first battery unit $BBU_1$ preferentially provides the power electricity to the first power supply unit $PSU_1$ if the first battery unit $BBU_1$ can provide the sufficient power electricity. In particular, the power supply units $PSU_1$-$PSU_N$ can realize whether the corresponding battery units $BBU_1$-$BBU_N$ can provide the sufficient power electricity. At this condition, as shown in FIG. 7B, the first battery unit $BBU_1$ discharges the first power supply unit $PSU_1$ through the discharge path $P_{D1}$. The remaining power supply units $PSU_2$-$PSU_N$ charge the corresponding battery units $BBU_2$-$BBU_N$ through their respective charge paths $P_{C2}$-$P_{CN}$. In this operation mode, since the first power supply unit $PSU_1$ can acquire the sufficient power electricity from the first battery unit $BBU_1$ without requesting the power supply support from other battery units, each control unit 131 provides the request command signal $S_{REQCMD}$ with the low voltage level so that the signal bus $S_B$ is in the high voltage level. At this condition, all first switches $SW_{REQ1}$-$SW_{REQN}$ and all second switches $SW_{SUP1}$-$SW_{SUPN}$ are turned off.

Figure 7C:
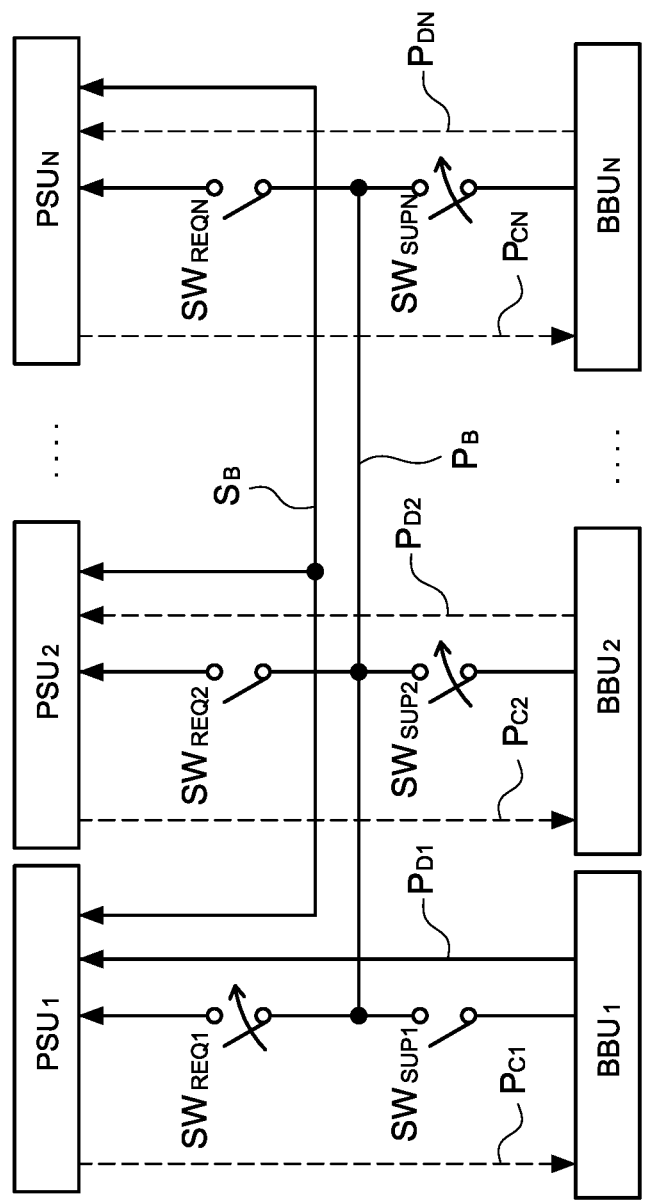
FIG. 7C is a schematic view of a third operation mode of the power supply system according to the present disclosure.

Please refer to FIG. 7C, which shows a schematic view of a third operation mode of the power supply system according to the present disclosure. The major difference between the third operation mode and the second operation mode is that the first power supply unit $PSU_1$ needs the power supply support but the first battery unit $BBU_1$ cannot provide the sufficient power electricity. At this condition, the first power supply unit $PSU_1$ needs the power electricity supported from other battery units $BBU_2$-$BBU_N$. For example, if the first power supply unit $PSU_1$ needs the power electricity of 3.5 kW, however, the first battery unit $BBU_1$ can only provide the power electricity of 3.0 kW to the first power supply unit $PSU_1$. Therefore, the first power supply unit $PSU_1$ needs the power electricity of 0.5 kW supported from other battery units $BBU_2$-$BBU_N$.

At this condition, the control unit 131 of the first power supply unit $PSU_1$ provides the request command signal $S_{REQCMD}$ with a high voltage level so that the signal bus $S_B$ is in the low voltage level, and the control unit 131 provides the first control signal $S_{REQ1}$ to turn on the first switch $SW_{REQ1}$. Moreover, since the signal bus $S_B$ is in the low voltage level and other power supply units $PSU_2$-$PSU_N$ realize that the signal bus $S_B$ is in the low voltage level according to the bus level signal $S_{REQI/O}$ received by themselves, the power supply units $PSU_2$-$PSU_N$ realize that no power support request is made by themselves and realize that other power supply units provide the power support request. At this condition, other power supply units $PSU_2$-$PSU_N$ further determine states of the power electricity (battery capacity) of the corresponding battery units $BBU_2$-$BBU_N$. If the battery units $BBU_2$-$BBU_N$ have sufficient power electricity, the power supply units $PSU_2$-$PSU_N$ stop charging the battery units $BBU_2$-$BBU_N$ and turn on the second switches $SW_{SUP2}$-$SW_{SUPN}$ through the second control signals $S_{SUP2}$-$S_{SUPN}$ so that the battery units $BBU_2$-$BBU_N$ are coupled to the common bus $P_B$ and provide the power electricity to the common bus $P_B$ for supplying the first power supply unit $PSU_1$. At this condition, besides the power electricity discharged from the first battery unit $BBU_1$, the first power supply unit $PSU_1$ can further use the power electricity supplied from other battery units $BBU_2$-$BBU_N$ through the common bus $P_B$.

In one embodiment, if other battery units $BBU_2$-$BBU_N$ are all capable (have the sufficient power electricity) to support the first power supply unit $PSU_1$ and are coupled to the common bus $P_B$ through the corresponding second switches $SW_{SUP2}$-$SW_{SUPN}$, the battery unit $BBU_2$-$BBU_N$ with the highest voltage will preferentially provide the power electricity to the common bus $P_B$. For example, if the second battery unit $BBU_2$ has the highest voltage, the second battery unit $BBU_2$ preferentially provides the power electricity to the common bus $P_B$. However, if the voltage of the second battery unit $BBU_2$ drops below the voltage of the third battery unit $BBU_3$ during the process of providing the power electricity to the common bus $P_B$ by the second battery unit $BBU_2$, the third battery unit $BBU_3$ replaces the second battery unit $BBU_2$ to provide the power electricity to the common bus $P_B$. if the voltage of the second battery unit $BBU_2$ and the voltage of the third battery unit $BBU_3$ are the same, the second battery unit $BBU_2$ and the third battery unit $BBU_3$ jointly provide the power electricity to the common bus $P_B$.

In another embodiment, if the second battery unit $BBU_2$ is not capable of supporting power supply but other battery units $BBU_3$-$BBU_N$ are capable of supporting power supply for the first power supply unit $PSU_1$, the second switch $SW_{SUP2}$ corresponding to the second battery unit $BBU_2$ is turned off so that the second power supply unit $PSU_2$ continuously charges the second battery unit $BBU_2$ and other battery units $BBU_3$-$BBU_N$ support power supply for the first power supply unit $PSU_1$.

Figure 7D:
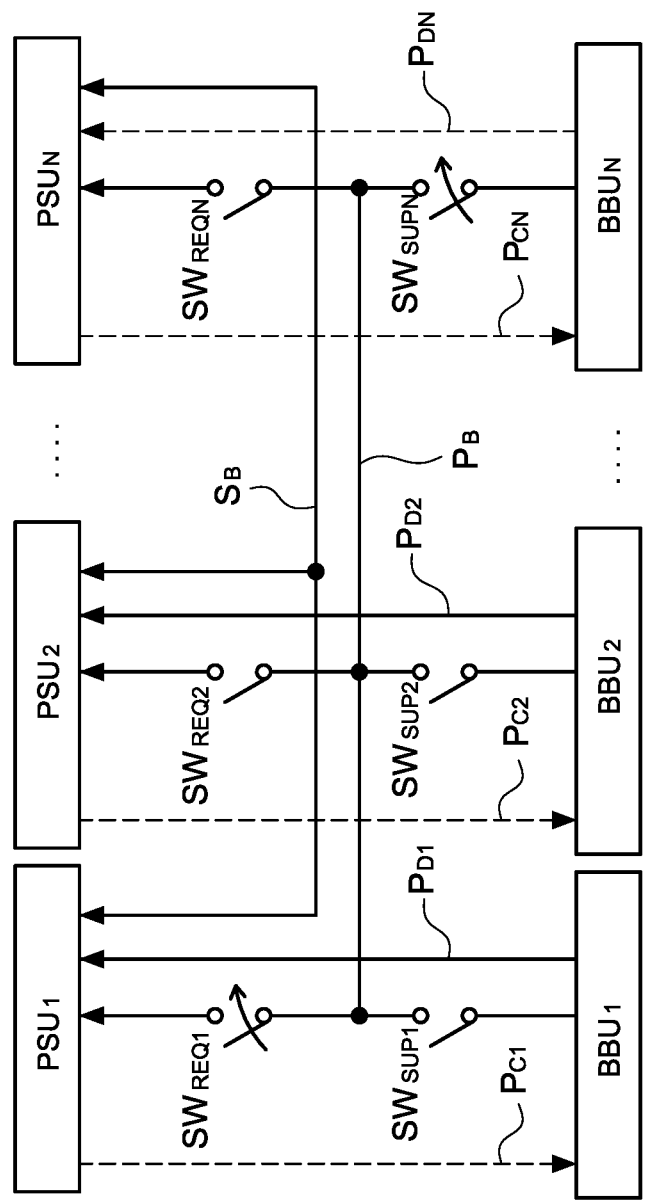
FIG. 7D is a schematic view of a fourth operation mode of the power supply system according to the present disclosure.

Please refer to FIG. 7D, which shows a schematic view of a fourth operation mode of the power supply system according to the present disclosure. The major difference between the fourth operation mode and the third operation mode is that the first power supply unit $PSU_1$ needs the power supply support and other battery units $BBU_2$-$BBU_N$ having sufficient power supply capacity to support the first power supply unit $PSU_1$ are coupled to the common bus $P_B$ through the respective second switch $SW_{SUP2}$-$SW_{SUPN}$. If the second power supply unit $PSU_2$ also needs the power supply support and the second battery unit $BBU_2$ can provide the sufficient power electricity to the second power supply unit $PSU_2$, the second power supply unit $PSU_2$ turns off the second switch $SW_{SUP2}$ through the second control signal $S_{SUP2}$ so that the second battery unit $BBU_2$ is removed from the common bus $P_B$ and the second battery unit $BBU_2$ discharges the second power supply unit $PSU_2$ through the discharge path $P_{D2}$. Other battery units $BBU_3$-$BBU_N$ are continuously coupled to the common bus $P_B$ to provide the power electricity or wait to provide the power electricity to the common bus $P_B$. In this operation mode, since the first power supply unit $PSU_1$ fails to acquire the sufficient power electricity from the first battery unit $BBU_1$ and needs to raise the power support request to acquire power electricity from other battery units (however, the second power supply $PSU_2$ can acquire the sufficient power electricity from the second battery unit $BBU_2$ without requesting the power supply support from other battery units), the first power supply unit $PSU_1$ provides the request command signal $S_{REQCMD}$ with the high voltage level through its own control unit 131 (other power supply units $PSU_2$-$PSU_N$, including the second power supply unit $PSU_2$ all provide the request command signal $S_{REQCMD}$ with the low voltage level) so that the signal bus $S_B$ is in the low voltage level.

Figure 7E:
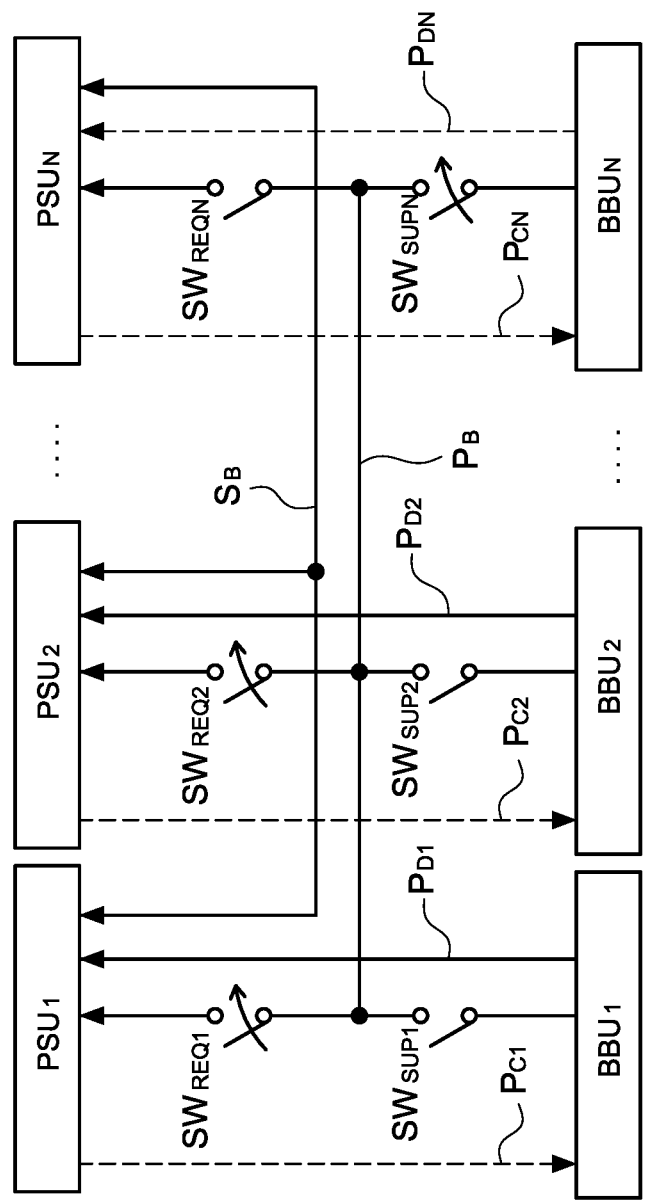
FIG. 7E is a schematic view of a fifth operation mode of the power supply system according to the present disclosure.

Please refer to FIG. 7E, which shows a schematic view of a fifth operation mode of the power supply system according to the present disclosure. The major difference between the fifth operation mode and the fourth operation mode is that the second power supply unit $PSU_2$ needs the power supply support but the second battery unit $BBU_2$ cannot provide the sufficient power electricity. At this condition, the second power supply unit $PSU_2$ needs the power electricity supported from other battery units $BBU_3$-$BBU_N$. For example, if the second power supply unit $PSU_2$ needs the power electricity of 3.5 kW, however, the second battery unit $BBU_2$ can only provide the power electricity of 2.5 kW to the second power supply unit $PSU_2$. Therefore, the first power supply unit $PSU_1$ needs the power electricity of 0.5 kW supported from other battery units $BBU_3$-$BBU_N$ and the second power supply unit $PSU_2$ also needs the power electricity of 1.0 kW supported from other battery units $BBU_3$-$BBU_N$.

At this condition, the control unit 131 of the second power supply unit $PSU_2$ provides the request command signal $S_{REQCMD}$ with a high voltage level, and the control unit 131 provides the first control signal $S_{REQ2}$ to turn on the first switch $SW_{REQ2}$. Moreover, since the signal bus $S_B$ is in the low voltage level and other power supply units $PSU_3$-$PSU_N$ realize that the signal bus $S_B$ is in the low voltage level according to the bus level signals $S_{REQI/O}$ received by themselves, the power supply units $PSU_3$-$PSU_N$ realize that no power support request is made by themselves and realize that other power supply units provide the power support request. At this condition, other power supply units $PSU_3$-$PSU_N$ further determine states of the power electricity (battery capacity) of the corresponding battery units $BBU_3$-$BBU_N$. If the battery units $BBU_3$-$BBU_N$ have sufficient power electricity, the corresponding battery units $BBU_3$-$BBU_N$ are controlled to continuously provide the power electricity to the common bus $P_B$ for supplying the first power supply unit $PSU_1$ and the second power supply unit $PSU_2$. At this condition, besides the power electricity discharged from the first battery unit $BBU_1$ for the first power supply unit $PSU_1$ and the power electricity discharged from the second battery unit $BBU_2$ for the second power supply unit $PSU_2$, the first power supply unit $PSU_1$ and the second power supply unit $PSU_2$ can further use the power electricity supplied from other battery units $BBU_3$-$BBU_N$ through the common bus $P_B$.

Figure 7F:
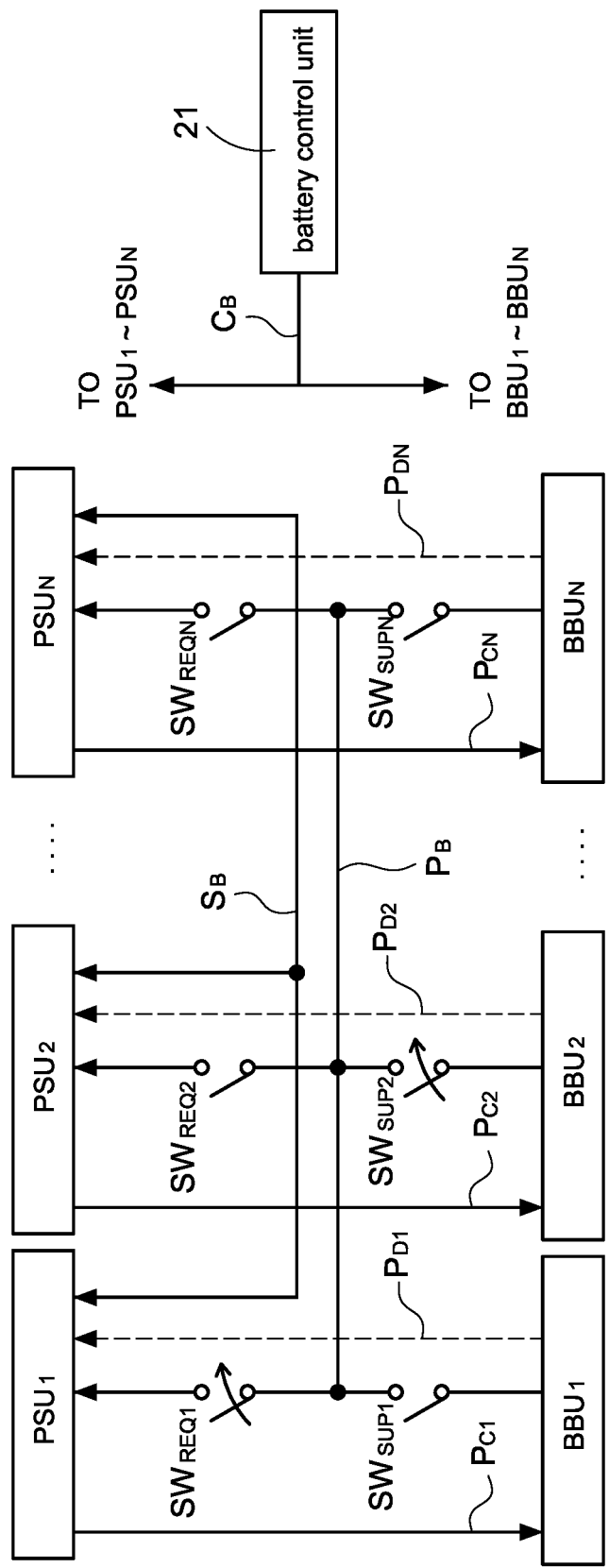
FIG. 7F is a schematic view of a sixth operation mode of the power supply system according to the present disclosure.
Figure 7G:
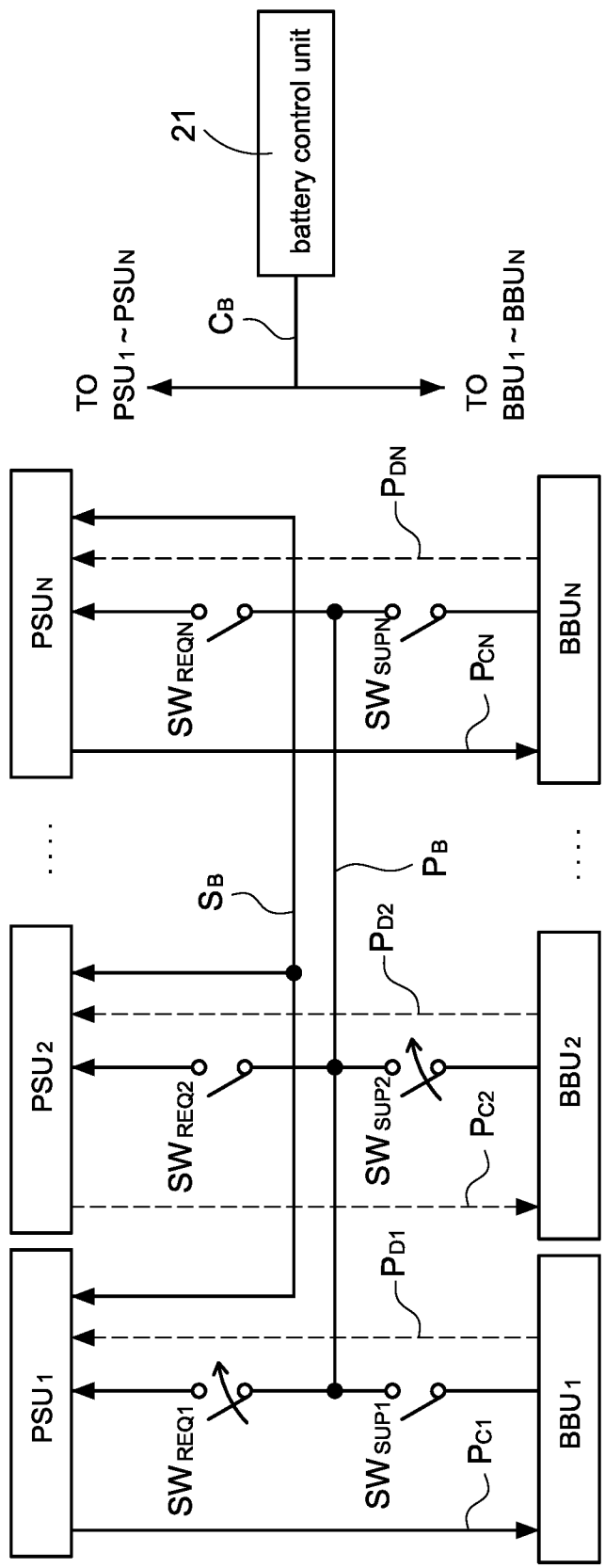
FIG. 7G is a schematic view of a seventh operation mode of the power supply system according to the present disclosure.

Please refer to FIG. 7F and FIG. 7G, which show schematic views of a sixth operation mode and a seventh of the power supply system according to the present disclosure, respectively. In the two operation modes, the detection and control of RSOC will be specifically explained. As shown in FIG. 7F, the battery control unit 21 is coupled to (the control units 131 of) all power supply units $PSU_1$-$PSU_N$ and all battery units $BBU_1$-$BBU_N$ through the communication bus $C_B$. The battery control unit 21 can acquire the RSOC state of each battery unit $BBU_1$-$BBU_N$ according to detections of the battery units $BBU_1$-$BBU_N$.

As shown in FIG. 7F, when the first power supply unit $PSU_1$ needs the power electricity supported from the battery unit, however, the RSOC of the first battery unit $BBU_1$ is abnormal or insufficient ("insufficient" as an example described below), for example but not limited to less than 20%, i.e., a critical state value. Since the battery control unit 21 realizes that the RSOC of the first battery unit $BBU_1$ is insufficient, the battery control unit 21 notifies the first power supply unit $PSU_1$ through the communication bus $C_B$ to turn on the first switch $SW_{REQ1}$. Similarly, since the battery control unit 21 realizes that the RSOC of the second battery unit $BBU_2$ is sufficient, the battery control unit 21 notifies the second power supply unit $PSU_2$ through the communication bus $C_B$ to turn on the second switch $SW_{SUP2}$. At this condition, the backup power path of the first power supply unit $PSU_1$ is not only connected to the first battery unit $BBU_1$ but also connected to the second battery unit $BBU_2$ through the common bus $P_B$ so that a power supplying path between the second battery unit $BBU_2$ having the sufficient RSOC detected by the battery control unit 21 and the first power supply unit $PSU_1$ is established in advance. At this condition, the first power supply unit $PSU_1$ normally operates without requesting the power supply support from any battery units, the second power supply unit $PSU_2$ still continuously charges the second battery unit $BBU_2$.

As shown in FIG. 7G, when the first power supply unit $PSU_1$ needs the power electricity supported from the battery unit, since a power-supplying path between the second battery unit $BBU_2$ and the first power supply unit $PSU_1$ has established, the second battery unit $BBU_2$ directly provides the power electricity to the first power supply unit $PSU_1$. At this condition, the second power supply unit $PSU_2$ stops charging the second battery unit $BBU_2$. Moreover, since the RSOC of the first battery unit $BBU_1$ is insufficient and the first battery unit $BBU_1$ fails to supply power to the first power supply unit $PSU_1$, the first power supply unit $PSU_1$ still keeps charging the first battery unit $BBU_1$.

Incidentally, although the second battery unit $BBU_2$ is used to support power supply as an example in the above description, in practical applications, multiple battery units $BBU_2$-$BBU_N$ can replace the first battery unit $BBU_1$ to supply power to the first power supply unit $PSU_1$. Specifically, the battery units $BBU_2$-$BBU_N$ with sufficient RSOC can be coupled to the common bus $P_B$ to provide the shared power electricity for the first power supply unit $PSU_1$. However, the battery units $BBU_2$-$BBU_N$ without sufficient RSOC cannot be used for power sharing.

Moreover, if only one battery unit is used as the power supply support, the battery unit with sufficient and the highest RSOC may be selected. For example, if the RSOC of the second battery unit $BBU_2$ is 80% and RSOCs of other battery units $BBU_3$-$BBU_N$ are between 30% to 70% (greater than the critical state value of 20%), the second battery unit $BBU_2$ may be selected to replace the first battery unit $BBU_1$ to provide the power electricity to the first power supply unit $PSU_1$.

In addition to the aforementioned considerations, the number of discharges of the battery unit can be also used as an evaluation. For example, it is assumed that the RSOC of the second battery unit $BBU_2$ is 80% and the RSOC of the third battery unit $BBU_3$ is 75% (the second highest RSOC). However, since the number of discharges of the third battery unit $BBU_3$ is less than the number of discharges of the second battery unit $BBU_2$, the third battery unit $BBU_3$ can replace the first battery unit $BBU_1$ to supply power to the first power supply unit $PSU_1$. In particular, the number of discharges of the battery unit can be acquired by the battery control unit 21. Similarly, the present disclosure does not use a single battery unit as the power supply support, and can select multiple battery units to participate in the power supply support by comprehensively evaluating the RSOC and the number of discharges. Therefore, the battery units with higher RSOC and/or battery units with lower number of discharges are used for power support to extend battery life, fault tolerance, and increase the reliability and stability of the power supply system.

Incidentally, the battery units with higher RSOC and/or the battery unit with lower number of discharges can be also used in the operation modes described in FIG. 7A to FIG. 7E, and the detail description is omitted here for conciseness.

Figure 8:
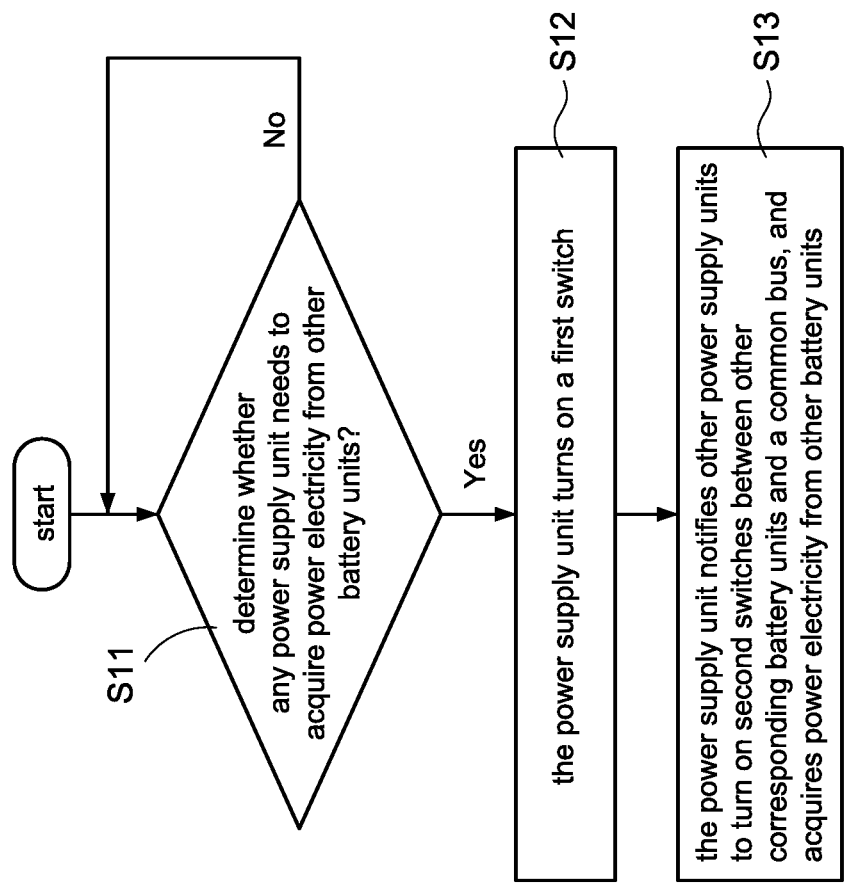
FIG. 8 is a flowchart of a method of operating the power supply system according to the present disclosure.

Please refer to FIG. 8, which shows a flowchart of a method of operating the power supply system according to the present disclosure. The power supply system includes a plurality of power supply units $PSU_1$-$PSU_N$ and a plurality of battery units $BBU_1$-$BBU_N$ corresponding to the power supply units $PSU_1$-$PSU_N$. Each power supply unit $PSU_1$-$PSU_N$ is coupled to a common bus $P_B$ through a first switch $SW_{REQ1}$-$SW_{REQN}$. Each battery unit $BBU_1$-$BBU_N$ is coupled to the common bus $P_B$ through a second switch $SW_{SUP1}$-$SW_{SUPN}$. The method of operating the power supply system includes the following steps.

First, it is to determine whether any one of the power supply units $PSU_1$-$PSU_N$ needs to acquire power electricity from other battery units $BBU_1$-$BBU_N$ (S11). If any one of the power supply units $PSU_1$-$PSU_N$ can acquire the sufficient power electricity from the corresponding battery unit $BBU_1$-$BBU_N$, it means that each of the power supply units $PSU_1$-$PSU_N$ does not need to request the power supply support from other battery units. At this condition, the power supply units $PSU_1$-$PSU_N$ can normally operate to not only provide the required power to the system but also charge the corresponding battery units $BBU_1$-$BBU_N$.

If the determination result of the step (S11) is "YES", that is, at least one power supply unit $PSU_1$-$PSU_N$ needs to acquire the power electricity from other battery units $BBU_1$-$BBU_N$. Therefore, the power supply unit $PSU_1$-$PSU$ that needs to acquire the power electricity from other battery units $BBU_1$-$BBU_N$ turns on the corresponding first switch $SW_{REQ1}$-$SW_{REQN}$ (S12) to request the power supply support from other battery units $BBU_1$-$BBU_N$.

Afterward, the power supply unit $PSU_1$-$PSU$ notifies other power supply units $PSU_1$-$PSU_N$ to turns on second switches $SW_{SUP1}$-$SW_{SUPN}$ between other battery units $BBU_1$-$BBU_N$ corresponding to the other power supply units $PSU_1$-$PSU$ and the common bus $P_B$ so that the power supply unit $PSU_1$-$PSU$ acquires the power electricity from other battery units $BBU_1$-$BBU_N$ (S13). For example, when the first power supply unit $PSU_1$ needs the power electricity supported from the battery unit but the first battery unit $BBU_1$ cannot provide the sufficient power electricity. At this condition, the first power supply unit $PSU_1$ needs the power electricity supported from other battery units $BBU_2$-$BBU_N$. Therefore, other battery units $BBU_2$-$BBU_N$ provide the power electricity to support the first power supply unit $PSU_1$ through the common bus $P_B$ so that the first power supply unit $PSU_1$ can provide the sufficient power electricity for the loads or back-end power-receiving apparatuses.

In summary, the present disclosure has the following features and advantages: the shared power electricity can be provided by a plurality of battery units (BBUs) cooperated with the common bus, so the discharge time of the battery units (BBUs) and the energy to the power supply unit (PSU) are no longer limited to the inherent capacity and specifications of the corresponding battery unit, i.e., the local battery. Therefore, the power supply unit (PSU) can effectively increase the utilization of the battery bank, improve configuration flexibility, increase the power efficiency of the system, and optimize the overall stability and reliability.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply system comprising:
    a plurality of power supply units, each power supply unit coupled to a common bus through a first switch, and
    a plurality of battery units, each battery unit being corresponding to each power supply unit, and each battery unit coupled to the common bus through a second switch,
    wherein each battery unit is configured to discharge the corresponding power supply unit through a discharge path when the corresponding power supply unit actively requires the power electricity provided from the battery unit, and each power supply unit is configured to charge the corresponding battery unit through a charge path,
    wherein when any one of the power supply units needs to acquire power electricity from at least one of the plurality of battery units, the power supply unit is configured to provide a first control signal to turn on the first switch corresponding to the power supply unit, and any one of other power supply units is configured to provide a second control signal to turn on the second switch corresponding to the at least one of the plurality of battery units so that the at least one of the plurality of battery units supply the required power electricity to the power supply unit through the common bus.

2. The power supply system as claimed in claim 1, wherein the discharge path is provided between the power supply unit and the battery unit corresponding to the power supply unit without being connected to the common bus.

3. The power supply system as claimed in claim 1, wherein the charge path is provided between the power supply unit and the battery unit corresponding to the power supply unit without being connected to the common bus.

4. The power supply system as claimed in claim 1, wherein each power supply unit comprises:
    a switch unit, and
    a control unit coupled to the switch unit, and configured to provide the first control signal to control the first switch, provide the second control signal to control the second switch, and provide a request command signal to control the switch unit.

5. The power supply system as claimed in claim 4, wherein the control unit of any one of the power supply units receives a bus level signal from a signal bus coupled to the switch unit to determine whether other power supply units raise power support requests.

6. The power supply system as claimed in claim 5, wherein when any one of the power supply units needs to acquire power electricity from the battery units of other power supply units, the power supply unit provides the request command signal with a first voltage level to control the switch unit so that a voltage level of the bus level signal is a second voltage level opposite to the first voltage level, and the control unit provides the first control signal to turn on the first switch.

7. The power supply system as claimed in claim 5, wherein when a voltage level of the request command signal of any one of the power supply units maintains and a voltage level of the bus level signal changes, the corresponding second switch is turned on.

8. The power supply system as claimed in claim 5, wherein the switch unit comprises:
    a switch coupled to the control unit and the signal bus, and
    a first resistor coupled to the signal bus and a power voltage.

9. The power supply system as claimed in claim 1, further comprising:
    a battery control unit coupled to the power supply units and the battery units through a communication bus and configured to acquire a relative state-of-charge (RSOC) and/or a number of discharges of any one of the battery units.

10. The power supply system as claimed in claim 9, wherein the RSOC of any one of other battery units is greater than or equal to a critical state value and/or the number of discharges of any one of other battery units is smaller.

11. A method of operating a power supply system, the power supply system comprising a plurality of power supply units and a plurality of battery units, and each battery unit being corresponding to each power supply unit, wherein each battery unit is configured to discharge the corresponding power supply unit through a discharge path when the corresponding power supply unit actively requires the power electricity provided from the battery unit, and each power supply unit is configured to charge the corresponding battery unit through a charge path, the method comprising steps of:
    determining whether any one of the power supply units needs to acquire power electricity from other battery units,
    providing a first control signal to turn on, by any one of the power supply units, a first switch coupled between the power supply unit and a common bus when the power supply unit needs to acquire power electricity from at least one of the plurality of battery units, and
    notifying, by the power supply unit, any one of other power supply units to provide a second control signal to turn on a second switch between the corresponding battery unit and the common bus so that the at least one of the plurality of battery units supply the required power electricity to the power supply unit through the command bus.

12. The method of operating the power supply system as claimed in claim 11, wherein the discharge path is provided between the power supply unit and the battery unit corresponding to the power supply unit without being connected to the common bus.

13. The method of operating the power supply system as claimed in claim 11, wherein the charge path is provided between the power supply unit and the battery unit corresponding to the power supply unit without being connected to the common bus.

14. The method of operating the power supply system as claimed in claim 11, wherein each power supply unit comprises:
- a switch unit, and
- a control unit coupled to the switch unit, and configured to provide the first control signal to control the first switch, provide the second control signal to control the second switch, and provide a request command signal to control the switch unit.

15. The method of operating the power supply system as claimed in claim 14, wherein the control unit of any one of the power supply units receives a bus level signal from a signal bus coupled to the switch unit to determine whether other power supply units raise power support requests.

16. The method of operating the power supply system as claimed in claim 15, wherein when any one of the power supply units needs to acquire power electricity from the battery units corresponding to other power supply units, the control unit corresponding to the power supply unit provides the request command signal to control the switch unit so that a voltage level of the bus level signal changes, and the control unit provides the first control signal to turn on the first switch.

17. The method of operating the power supply system as claimed in claim 15, wherein when a voltage level of the request command signal of any one of the power supply units maintains and a voltage level of the bus level signal changes, the corresponding second switch is turned on.

18. The method of operating the power supply system as claimed in claim 15, wherein the switch unit comprises:
- a switch coupled to the control unit and the signal bus, and
- a first resistor coupled to the signal bus and a power voltage.

19. The method of operating the power supply system as claimed in claim 11, wherein the power supply system further comprises:
- a battery control unit coupled to the power supply units and the battery units through a communication bus and configured to acquire a relative state-of-charge (RSOC) and/or a number of discharges of any one of the battery units.

20. The method of operating the power supply system as claimed in claim 19, wherein the RSOC of any one of other battery units is greater than or equal to a critical state value and/or the number of discharges of any one of other battery units is smaller.

* * * * *